United States Patent [19]

Miyatani et al.

[11] 4,061,555

[45] Dec. 6, 1977

[54] WATER PHOTOLYSIS APPARATUS

[75] Inventors: Kazuo Miyatani, Tokyo; Isao Sato, Kodaira, both of Japan

[73] Assignee: RCA Corporation, New York, N.Y.

[21] Appl. No.: 760,551

[22] Filed: Jan. 19, 1977

[51] Int. Cl.$^2$ .................. C25B 9/00; C25B 11/02; C25B 1/02

[52] U.S. Cl. .................. 204/242; 204/129; 204/278; 204/290 R; 204/DIG. 3; 250/527; 429/111

[58] Field of Search .............. 204/128, 129, 242, 278, 204/290 R, 290 F, DIG. 3; 250/527; 429/111

[56] References Cited

U.S. PATENT DOCUMENTS

| | | | |
|---|---|---|---|
| 3,925,212 | 12/1975 | Tchernev | 250/527 |
| 4,011,149 | 3/1977 | Nozik | 204/129 |
| 4,021,323 | 5/1977 | Kilby et al. | 204/129 |

FOREIGN PATENT DOCUMENTS

| | | | |
|---|---|---|---|
| 1,273,498 | 7/1968 | Germany | 204/290 R |

OTHER PUBLICATIONS

A. Fujishima et al., "Electrochemical Photolysis of Water at a Semiconductor Electrode," *Nature*, vol. 238, July 1972, pp. 37–38.

H. Morisaki et al., "Photoelectrolysis of Water with TiO$_2$-Covered Solar-Cell Electrodes," *Appl. Phys. Lett.*, vol. 29, pp. 338–340 (1976).

*Primary Examiner*—John H. Mack
*Assistant Examiner*—Aaron Weisstuch
*Attorney, Agent, or Firm*—H. Christoffersen; B. E. Morris; D. N. Calder

[57] ABSTRACT

A nickel cathode has a nickel oxide layer on its surfaces. A plurality of spaced apart grooves are in the nickel oxide layer and extend into the nickel. The cathode can be utilized in a water photolysis apparatus which also includes an N type photocatalytic semiconductor anode. Both the cathode and anode are in an aqueous basic electrolyte solution. The anode and cathode are electrically biased by a solar cell. The biasing potential of the solar cell raises the voltage potential of the cathode and lowers the Fermi level of the anode.

7 Claims, 2 Drawing Figures

WATER PHOTOLYSIS APPARATUS

BACKGROUND OF THE INVENTION

The present invention relates to a cathode which is useful in a water photolysis apparatus and, more specifically, to a cathode which improves the efficiency of the water photolysis apparatus.

The evolution of hydrogen and oxygen from a water photolysis apparatus is known. Water photolysis produces a dissociation of water into hydrogen and oxygen by the influence of light on at least one of a pair of semiconductor electrodes. The generated hydrogen can be burned as fuel. With the increasing concern for sources of energy, the water photolysis apparatus has become of increased interest to those in the energy generation field.

A typical prior art water photolysis apparatus includes a titanium dioxide ($TiO_2$) anode and a platinum cathode. This conventional water photolysis apparatus has a maximum quantum yield of oxygen evolution in the range of 80 – 85%, but only about a 20% quantum yield for hydrogen evolution using an applied bias voltage of about 0.9 volt. It has been determined that for proper operation the platinum cathode surface must be between 5 to 50 times the area of the anode surface. The expense of a large platinum cathode and the low hydrogen yield in the conventional water photolysis apparatus contribute to its non-competitiveness as a source of hydrogen. Therefore, it would be most desirable to increase the cathode efficiency to make the water photolysis process more competitive as a means of generating hydrogen fuel.

SUMMARY OF THE INVENTION

A photolysis apparatus includes a housing containing an aqueous basic electrolyte solution. An anode and cathode are situated in the housing and contact the solution. The cathode includes a nickel substrate and a nickel oxide layer on said substrate surface. A plurality of spaced apart grooves extend through said nickel oxide layer and into said nickel substrate, thereby exposing limited areas of the nickel to said solution.

DETAILED DESCRIPTION OF THE INVENTION

Figure 1:
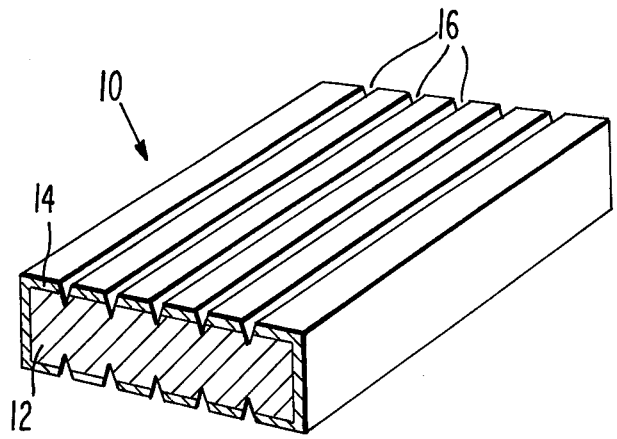
FIG. 1 is a cross-sectional perspective view of the cathode of the present invention.

Referring to FIG. 1, the cathode of the present invention, which is capable of being utilized in a water photolysis apparatus is designated as 10. The operation of the cathode 10 in a water photolysis apparatus will be discussed subsequently.

The cathode 10 includes a substrate 12 of nickel with a nickel oxide layer 14 on the surfaces of the substrate 12. The nickel oxide layer 14 is typically about 100 micrometers in thickness, and is nickel monoxide. A plurality of spaced apart grooves 16 are in the oxide layer 14 and extend into the nickel substrate 12. These grooves remove a small portion of the nickel oxide layer 14 exposing a portion of the substrate 12 so that the cathode 10 can be electrically contacted to other elements of the photolysis apparatus, subsequently described. The grooves 16 may be substantially parallel to each other.

In the fabrication of the cathode 10, a nickel foil, which is the substrate 12, is placed in a conventional furnace and heated in an oxygen atmosphere to a temperature of about 1000° C. for about 24 hours, forming the nickel oxide layer 14 on the substrate 12 surfaces. The grooves 16 are then formed in the nickel oxide layer 14 and the substrate 12 by mechanically scribing, for example, with a tungsten carbide edge, or by conventional photolithographic and etching techniques. The grooves 16 account for a very small portion of the total cathode 10 surface area. The fabrication of the cathode 10 is completed by etching a small portion of the nickel oxide layer 14 and exposing the substrate 12 for the purpose of making electrical contact to the cathode 10.

Figure 2:
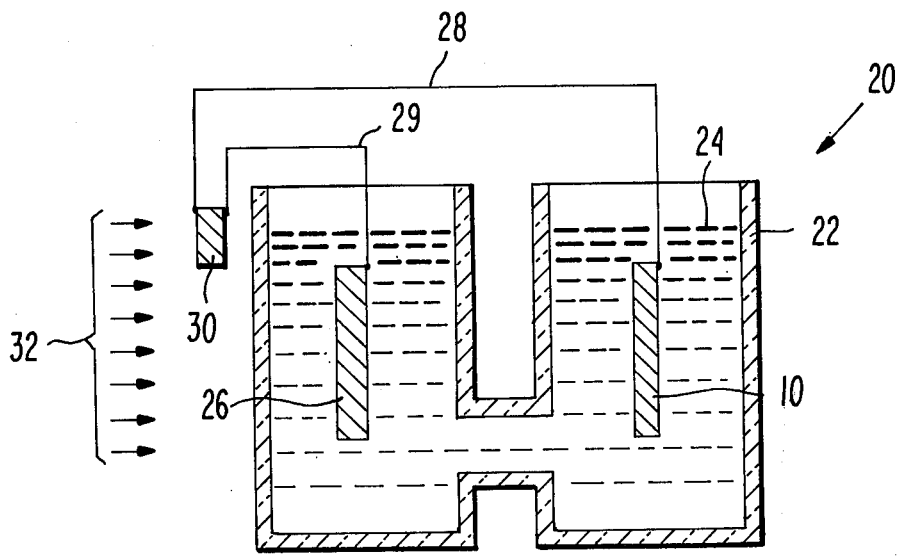
FIG. 2 is a cross-sectional view of a water photolysis apparatus utilizing the cathode of FIG. 1.

Referring to FIG. 2, the cathode 10 of the present invention is utilized in a water photolysis apparatus designated as 20. The water photolysis apparatus 20 includes a housing 22 which contains therein an aqueous basic electrolyte solution 24, i.e., water and a basic electrolyte. It is well known to those in the chemical art that an electrolyte is a chemical compound which when molten or dissolved in certain solvents, usually water, will conduct an electric current. It is assumed for the purpose of describing the present invention that the base electrolyte dissolved in the water is sodium hydroxide (NaOH) at a concentration in the range of about 0.1 to 5.0 Normal, but other base electrolytes can be employed, such as potassium hydroxide, as well as base salts, such as calcium carbonate. Also contained in the housing 22 and in contact with the solution 24 is the cathode 10 of the present invention and an N type photocatalytic semiconductor anode 26. The anode 26 and cathode 10 are spaced from one another in the housing 22. The anode is typically of a semiconductor material such as titanium dioxide ($TiO_2$), also known as rutile.

A first wire 28 is in electrical contact with the cathode 10, and a second wire 29 is in electrical contact with the anode 26. Both first and second wires 28 and 29 are in electrical contact with electrical biasing means 30, which is thus in series with the cathode 10 and anode 26. For the purpose of describing the water photolysis apparatus 20, the electrical biasing means 30 is a solar cell. The solar cell 30 is a conventional solar cell, typically of silicon.

When the anode 26 comes into electrical contact with the cathode 10, through the first and second wires 28 and 29, the resulting contact potential lowers the Fermi level of the anode 26 to the level of the cathode 10 and forms a Schottky barrier at the anode 26/solution 24 interface. The Schottky barrier at the anode 26/solution 24 interface exists with or without the influence of electromagnetic radiation, i.e., light striking the anode 26.

In the operation of the water photolysis apparatus 20, radiation 32 is incident onto the anode 26, consequently at least a portion of the housing 22 is transparent to radiation. Some of the photon energy of the incident radiation 32 is absorbed by the photocatalytic semiconductor anode 26 resulting in the generation of electron-hole pairs. Another portion of the radiation 32 is incident on the solar cell 30 resulting in the generation of a photovoltaic potential from the solar cell 30. With the generation of electron-hole pairs in the anode 26, an electrochemical reaction occurs at the anode 26/solution 24 interface resulting in the transfer of charge across the interface. More specifically, the generated holes are attracted to the Schottky barrier at the anode 26/solution 24 interface; resulting in the holes going into the solution 24. These holes, being of a positive charge, react with hydroxyl ions in the solution 24, forming oxygen and water. This reaction is evidenced by the following equation:

$$4OH^- + 4p^+ \rightarrow O_2 + 2H_2O$$

where "$p+$" is a hole. The generated electrons from the anode 26 flow to the cathode 10 through the first and second wires 28 and 29, requiring an increased voltage potential as the current passes through the solar cell 30. The electrons, which have travelled to the cathode 10, are then attracted to the solution 24 and leave the cathode 10 at the cathode 10/solution 24 interface and react with water, forming hydrogen and hydroxyl ions, as evidenced by the following formula:

$$4H_2O + 4e^- \rightarrow 2H_2 + 4\ OH^-$$

where "$e-$" is an electron. Thus, hydrogen forming at the cathode 10 and oxygen forming at the anode 26 are the by-products of the electrochemical reactions taking place at the anode 26/solution 24 interface and cathode 10/solution 24 interface. From the description of the operation of apparatus 30, it is evident that a current flow through the anode 26, cathode 10 and solution 24 is initiated by the radiation 32 impinging on the anode 26. The current through the anode 26, cathode 10 and first and second wires 28 and 29 is the result of electron flow, while the current is carried through the solution 24 back to the anode 26 by ion flow.

The voltage bias potential of the solar cell 30 serves the purpose of raising the cathode 10 voltage potential and also of lowering the Fermi level of the anode 26. Specifically, the solar cell 30 raises the potential of the cathode 10 to an operating range of about 0.5 to 1.0 volt, which is about 0.15 to 0.3 volt above the potential of the cathode 10 if it were unbiased. This increase in cathode 10 potential is hereinafter referred to as an over-voltage. The over-voltage applied to cathode 10 raises the potential of the cathode 10 to a higher potential level than needed for the evolution of hydrogen gas.

As was previously stated, prior art water photolysis apparatus have a maximum quantum yield for hydrogen evolution at the cathode of about 20%. The advantage of the cathode 10 of the present invention is that it shows a higher efficiency in hydrogen evolution, which is a consequence of an increase in the utilization of circuit electrons in the cathode 10 for the generation of hydrogen. Measurements from the cathode 10 have shown approximately 100% current conversion efficiency in hydrogen generation with an applied solar cell 30 bias potential from 0.5 to 1.0 volt. It is believed that the increase in hydrogen evolution is due to the nature of the cathode 10 and also is a result of the over-voltage applied to the cathode 10. Apparently, the nickel oxide layer 14 of the cathode 10 is very tough and strongly adheres to the substrate 12, thereby insulating the substrate 12 from the electrolyte in the solution 24. Thus, the flow of electrons leaving the cathode 10 and going into the solution 24 is restricted to that portion of substrate 12 exposed by grooves 16 to the solution 24. The exposed portions of substrate 12 operate as high density catalytic active centers for hydrogen evolution. The restrictions in electron flow results in a more efficient current conversion into hydrogen gas. Furthermore, with the cathode 10 biased to a voltage in the range of about 0.5 to 1 volt, the Fermi level of cathode 10 is about 0 to 0.15 volt above the potential needed for hydrogen gas evolution, which operates to increase hydrogen gas evolution. In the conventional photolysis apparatus the cathode Fermi level is always less or about equal to the potential needed for hydrogen gas evolution even when the cathode is biased in the range of 0 to 10 volts, the probable reason being that conventional photolysis apparatus apply a bias voltage only to lower the anode potential and not to raise the cathode potential.

It has been found that only about five grooves 16 are required on the surface of a nickel cathode 10, which is 1 cm$^2$ in size, in order to drive an anode 26, 1 cm$^2$ in size, of titanium dioxide. In the conventional photolysis apparatus the cathode has to be 5 to 50 times the size of the anode. Furthermore, it has been observed that hydrogen gas evolution occurs most efficiently from the grooves 16 when the grooves 16 are vertical, i.e., perpendicular to the surface of the solution 24, so that the hydrogen gas can depart freely toward the solution 24 surface where it is collected.

Therefore, the cathode 10 of the present invention provides hydrogen gas evolution in water photolysis apparatus at a much higher efficiency than demonstrated by prior art cathodes.

We claim:
1. A cathode capable of being utilized in a photolysis apparatus comprising:
   a nickel substrate; and
   a nickel monoxide layer on said nickel substrate with a plurality of spaced apart grooves, said grooves extending through said nickel oxide layer and into said nickel substrate.
2. The cathode in accordance with claim 1 wherein said nickel monoxide layer is about 100 micrometers in thickness.
3. A photolysis apparatus comprising:
   a housing;
   an aqueous basic electrolyte solution in said housing;
   a photocatalytic semiconductor anode in said housing and contacting said solution;
   a cathode in said housing and contacting said solution, wherein said cathode is comprised of a nickel substrate and a nickel monoxide layer on said nickel substrate surfaces, and further having a plurality of spaced apart grooves, said grooves extending through said nickel oxide layer and exposing said nickel substrate; and
   an electrical biasing means in series with said anode and cathode.
4. The photolysis apparatus in accordance with claim 3 wherein said solution is of water and sodium hydroxide, with said sodium hydroxide at a concentration in the range of about 0.1 to 5 Normal.
5. The photolysis apparatus in accordance with claim 3 wherein at least a portion of said housing is transparent to radiation.
6. The photolysis apparatus in accordance with claim 3 wherein said biasing means is a solar cell.
7. The photolysis apparatus in accordance with claim 6 wherein said solar cell is capable of biasing said cathode in the range of about 0.5 to 1.0 volt.

* * * * *